United States Patent
Carrera et al.

(10) Patent No.: US 12,043,746 B2
(45) Date of Patent: Jul. 23, 2024

(54) DUST REPELLENT SILICA AND TITANIA COATINGS

(71) Applicant: Pioneer Astronautics, Lakewood, CO (US)

(72) Inventors: Stacy L. Carrera, Golden, CO (US); Alexandra V. Gordienko-Stanton, Arvada, CO (US); Franklin D. R. Maharaj, Boulder, CO (US)

(73) Assignee: Voyager Space IP Holdings, LLC, Denver, CO (US)

( * ) Notice: Subject to any disclaimer, the term of this patent is extended or adjusted under 35 U.S.C. 154(b) by 126 days.

(21) Appl. No.: 17/741,080

(22) Filed: May 10, 2022

(65) Prior Publication Data

US 2023/0074256 A1   Mar. 9, 2023

Related U.S. Application Data

(60) Provisional application No. 63/242,218, filed on Sep. 9, 2021.

(51) Int. Cl.
| | | |
|---|---|---|
| *C09D 1/00* | (2006.01) | |
| *C09D 5/00* | (2006.01) | |
| *C09D 7/20* | (2018.01) | |
| *C09K 3/22* | (2006.01) | |

(52) U.S. Cl.
CPC ............... *C09D 1/00* (2013.01); *C09D 5/00* (2013.01); *C09D 7/20* (2018.01); *C09K 3/22* (2013.01)

(58) Field of Classification Search
CPC ... C09D 1/00; C09D 5/00; C09D 7/20; C09D 7/61; B05D 2201/00; B05D 1/18; B05D 5/00; B05D 2202/10; B05D 2202/25; B05D 2203/22; B05D 2203/35; B05D 2601/22; B05D 2601/24; B08B 17/02; B08B 17/06; C01G 23/003; C01G 23/053; C03C 15/00; C03C 17/256; C03C 2217/23; C03C 2218/111; C03C 23/0075; C09K 3/22; C23C 18/1254; C23C 18/1216; C25D 13/02; D06M 11/36; D06M 11/46; D06M 11/79; D06M 13/144; D21H 19/40; D21H 19/385
See application file for complete search history.

(56) References Cited

U.S. PATENT DOCUMENTS

| | | | |
|---|---|---|---|
| 4,275,118 A | * | 6/1981 | Baney ............... C08K 3/22 427/393 |
| 2012/0024312 A1 | | 2/2012 | Wilson |

FOREIGN PATENT DOCUMENTS

| | | | |
|---|---|---|---|
| CN | 103613283 B | * | 8/2015 |
| CN | 110498614 A | * | 11/2019 |
| CN | 111153600 | | 5/2020 |
| EP | 2484445 | | 8/2012 |
| JP | 06071219 A | * | 3/1994 |

OTHER PUBLICATIONS

International Search Report from Application No. PCT/US2022/028539 dated Oct. 6, 2022.

* cited by examiner

*Primary Examiner* — Anthony J Green
(74) *Attorney, Agent, or Firm* — FisherBroyles, LLP; Cara L. Crowley-Weber; Gregory T. Fettig

(57) ABSTRACT

Novel coatings disclosed herein can be used to mitigate dust adhesion. In one embodiment, a method of making a dust repellant coating includes combining a titanium dioxide sol with colloidal silica to form a mixture. The method also includes adding solvent to the mixture, stirring the mixture for about an hour, and filtering the mixture into a solution of titanium dioxide and silica dioxide.

7 Claims, 4 Drawing Sheets

DUST REPELLENT SILICA AND TITANIA COATINGS

CROSS REFERENCE TO RELATED APPLICATIONS

This patent application claims priority to, and thus the benefit of an earlier filing date from, U.S. Provisional Patent Application No. 63/242,218 (filed Sep. 9, 2021), the contents of which are hereby incorporated by reference.

BACKGROUND

Mineral dust particles can stick to surfaces which in turn can increase wear, prevent smooth contact between components, cause contamination, change thermal properties of the surfaces, prevent light propagation through optical surfaces, cause surface degradation, and/or enable the spread of dust. For example, mechanical systems operating in dusty conditions tend to degrade faster when the internal components are exposed to abrasive dust particles. In dusty environments, visibility through optical surfaces such as windshields and headlights can be of critical importance for vehicle operation. Surface degradation due to dust can also lead to a permanent decrease in performance of these surfaces. And, dust adhesion can decrease the lifetime of mechanical and optical systems, increase maintenance costs, and add complexity to standard operations. Dust particles can dramatically increase the cost of equipment operation and can ultimately lower the overall lifespan of the equipment.

SUMMARY

Novel coatings disclosed herein can be used to mitigate dust adhesion. In one embodiment, a method of making a dust repellant coating includes combining a titanium dioxide sol with colloidal silica to form a mixture. The method also includes adding a solvent (e.g., isopropanol) to the mixture, stirring the mixture for about an hour, and filtering the mixture into a solution of titanium dioxide (e.g., between about one and ten percent titanium dioxide) and silica dioxide (e.g., between about ninety and ninety-nine percent silica dioxide).

This method may include scaling material measurements by a predetermined factor to increase an amount of the dust repellant coating. For example, the titanium dioxide, the colloidal silica, and the isopropanol may be proportionally increased to increase the overall amount of the dust repellent coating.

In some embodiments, the method includes adding at least one of a metal additive, an organic additive, a metal salt, or a metal oxide to the mixture. For example, the metal oxide may include at least one of alpha alumina, gamma alumina, titania, zirconia, copper oxide, zinc oxide, or mixtures thereof. The metal salt comprises at least one of copper, silver, chromium, aluminum, gold, or mixtures thereof. The organic additive comprises at least one of methanol, ethyl alcohol, isopropyl alcohol, 1-butanol, 2-butanol, isobutanol, tert-butanol, or mixtures thereof.

In another embodiment, a method of coating a surface to repel dust may include filtering a mixture of a titanium dioxide sol, colloidal silica, and a solvent (e.g., isopropanol) into a solution of about two percent titanium dioxide and about ninety eight percent silica dioxide. The method may also include applying the solution as a coating to the surface, and adhering the coating to the surface.

Applying the solution to the surface may include applying the solution via at least one of a chemical vapor deposition, a physical vapor deposition, an electrochemical deposition, a spray coating, a roll-to-roll coating, a spin-coating, or a dip-coating. Adhering the coating to the surface may include heating the coating on the surface.

In some embodiments, the coating is operable to reflect at least one of infrared radiation or ultraviolet radiation. In some embodiments, the coating is operable to prevent surface discoloration. In some embodiments, the coating is operable to prevent friction between surfaces. In some embodiments, the coating is operable to prevent bacteria from adhering to a surface. In some embodiments, the coating is operable to protect a surface from physical abrasion.

In another embodiment, a dust repellant coating includes about one part of a titanium dioxide sol, and about nine parts of colloidal silica and combined with said titanium dioxide. The coating may also include about ten parts of solvent (e.g., isopropanol) stirred with said titanium dioxide and said colloidal silica for about an hour, and filtered into a solution of titanium dioxide (e.g., between about one and ten percent titanium dioxide) and silica dioxide (e.g., between about ninety and ninety-nine percent silica dioxide). In some embodiments, dust repellant performance is optimal when the solution comprises about two percent titanium dioxide and about ninety-eight percent silica dioxide.

In some embodiments, the dust repellant coating is operable to repel dust in a vacuum. In some embodiments, the dust repellant coating is operable for application to a surface via at least one of a chemical vapor deposition, a physical vapor deposition, an electrochemical deposition, a spray coating, a roll-to-roll coating, a spin-coating, or a dip-coating. In some embodiments, the dust repellant coating is operable for application to a surface in a vacuum. In some embodiments, the dust repellant coating is operable to repel dust in air.

The various embodiments disclosed herein may be implemented in a variety of ways as a matter of design choice. For example, some embodiments herein are implemented via control processes that include hardware, software, firmware, and various combinations thereof to form the dust repellant coating exemplarily disclosed herein. Other exemplary embodiments are described below.

BRIEF DESCRIPTION OF THE DRAWINGS

Some embodiments are now described, by way of example only, and with reference to the accompanying drawings. The same reference number represents the same element or the same type of element on all drawings.

DETAILED DESCRIPTION OF THE DRAWINGS

Figure 1B:
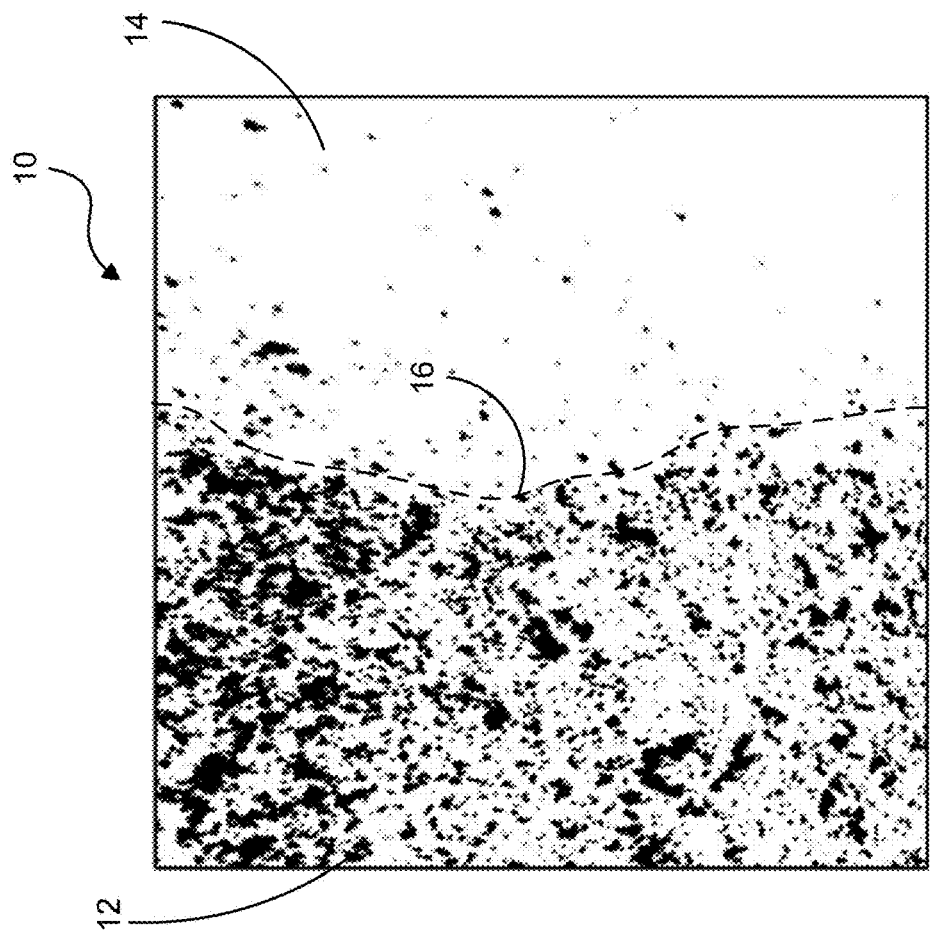
FIGS. 1A and 1B are microscope images of a substrate illustrating an exemplary dust repellant coating.

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

The titania-silica coating embodiments disclosed herein can be applied to a variety of surfaces in a variety of different applications to protect against the negative effects of dusty environments. The titania-silica coating utilizes the relatively low dielectric constants of both titanium dioxide and silicon dioxide to reduce particle adhesion to surfaces in a wide variety of environments. For example, dust adheres to surfaces primarily through the van der Waals force, with gravitational forces, electrostatic forces, and/or capillary forces contributing as well. Due to the combination of these forces, complete dust removal from surfaces can be difficult or impossible. Lowering the dielectric constant of the surface material effectively lowers the van der Waals force and prevents dust adhesion.

The titania-silica coating can be applied with various physical, chemical, and mechanical film deposition techniques. And, the titania-silica coating has several benefits. For example, the coating can increase hardness and abrasion resistance of some surfaces, the coating can protect surfaces from fading from high UV exposure, the coating can protect surfaces from overheating from radiative infrared sources, and the coating may have anti-bacterial properties.

In some embodiments, the titania-silica coating is a thin film coating technology that protects coated surfaces from effects of harsh dusty environments. This coating may be produced from a mixture of silicon dioxide and a substantial amount of titanium dioxide. Additionally, certain additives, including but not limited to copper, have been shown to modify performance in some instances.

Crystalline silicon dioxide has a relatively low dielectric constant of 3.9. The dielectric constant subsequently lowers the Hamaker constant for surface and dust particle pairs, which in turn dictates the van der Waals forces between two materials. Some examples of common material surfaces and common dust particle materials with corresponding Hamaker constants are shown in the table below.

| Surface material | Hamaker constant for silica, $10^{-20}$ J | Hamaker constant for aluminia, $10^{-20}$ J |
|---|---|---|
| $SiO_2$ | 7.59 | 11.6 |
| $TiO_2$ | 9.46 | 14.2 |
| Al | 35.5 | 30.0 |
| Cr | 37.1 | 31.3 |
| Steel (334) | 21.2 | — |

The van der Waals force linearly depends on the Hamaker constant between the two materials in question:

$$F_VDW = \frac{AR}{6z^2},$$

where A is the non-retarded Hamaker constant, R is the radius of the dust particle and z is the distance between the particle and the surface of the material in question. Addition of material to the coating layer can lower the van der Waals force for silica and titania particles by up to a factor of 2.7 or 4.9 respectively.

It should also be noted that an addition of titania to a colloidal silica network lowers this effect slightly as the average dielectric constant across different phases is slightly higher than that of silica. However, this addition enhances other critical properties of the coating, including but not limited to, film adhesion, hardness of the coating, abrasion resistance, and UV and IR blocking properties. Additionally, the relative dielectric constant for some forms of titania, such as anatase, are lower than that of others. These different titania phases can be tuned within almost any film deposition technique, either during film growth or during post-treatment to better suit the application of a final product.

Figure 1A:
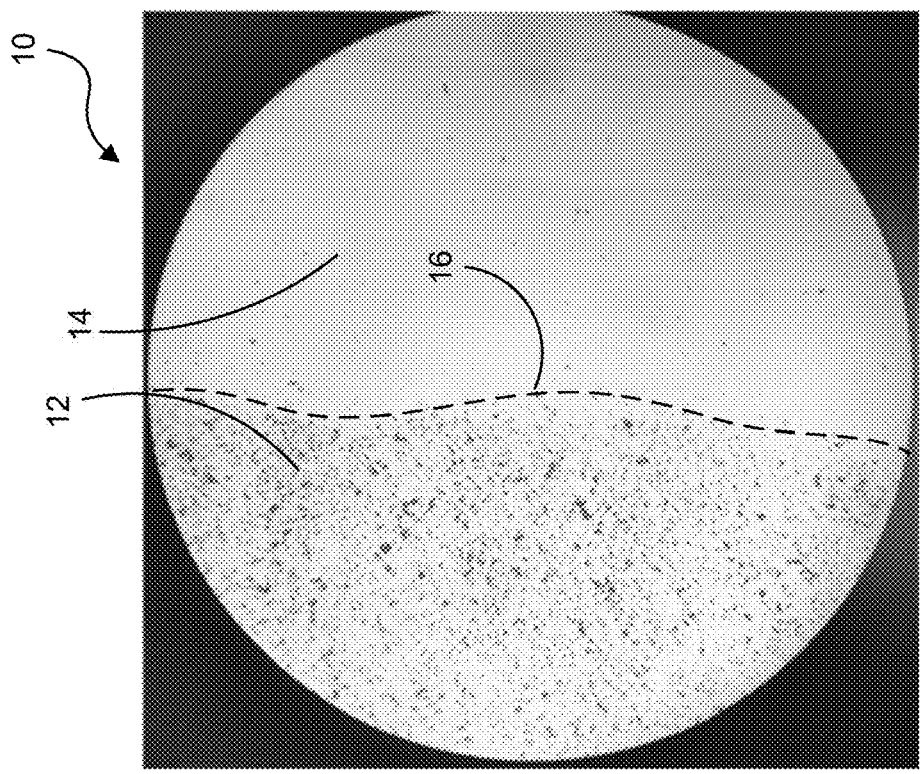

With this in mind, FIGS. 1A and 1B are microscope images of a substrate illustrating an exemplary dust repellant coating. In this embodiment, a substrate 10 is partially coated with a dust repellent coating in accordance with any of the exemplary embodiments disclosed herein. More specifically, the portion 14 of the substrate 10 is coated with the dust repellent coating along the line of demarcation 16. The remaining portion 12 of the substrate 10 is left uncoated. Then, dust is applied to the entirety of the substrate 10 and viewed under a microscope. When the substrate 10 is for example tilted, gravitational forces allow the dust to simply slide off the substrate 10. That is, the dust does not adhere to the coated portion of the substrate 10. And, as can be seen in FIG. 1A, the dust does adhere to the uncoated portion 12 of the substrate 10 (e.g., via van der Waals force, gravitational forces, electrostatic forces, capillary forces, etc.).

FIG. 1B illustrates a magnified view of the substrate 10. In this image, dust particles are still shown as adhering to the coated portion 14 of the substrate 10. However, these dust particles may be simply adhering to the substrate 10 due to imperfections in the coating application (e.g., crevices, grooves, etc.). And, the uncoated portion 12 of the substrate 10 shows that dust particles adhere more heavily to the substrate 10.

Figure 2:
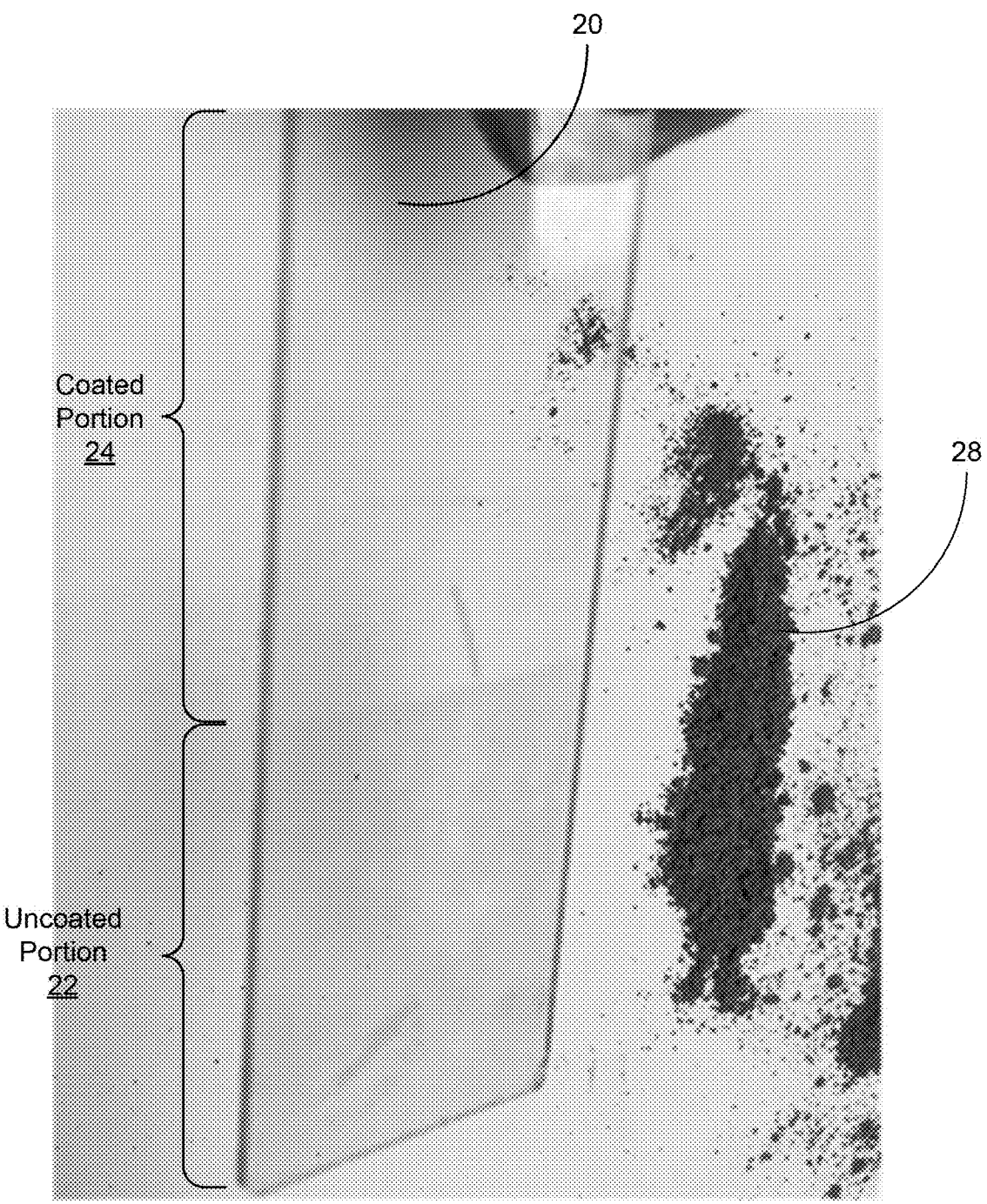
FIG. 2 is an image of a slide partially coated with an exemplary dust repellant coating.

FIG. 2 is an image of a transparent glass slide 20 partially coated with any of the exemplary dust repellant coatings disclosed herein. In this illustration, the portion 24 of the slide 20 was coated with the dust repellent coating whereas the portion 22 of the slide 20 was left uncoated. After the dust repellent coating was allowed to adhere to the coated portion 24, dust/dirt particles 28 were applied to the slide 20. Then, the slide 20 was tilted so as to allow the dust/dirt particles 28 to fall off the slide 20. As can be seen in the figure, the coated portion 24 of the slide 20 remains optically transparent as the dust/dirt particles 28 do not adhere to the slide 20. And, while the vast majority of the dust/dirt particles 28 fall off the uncoated portion 22 of the slide 20, a residue remains with the uncoated portion 22 of the slide 20. This residue renders the slide 20 to be no longer optically transparent. Of course, this example is not intended to only illustrate optical transparency of a material that is been coated with the dust repellent coatings. Rather, this example is intended to show that dust/dirt generally does not adhere to any surface that has been coated with the dust repellent coatings disclosed herein. In this regard, the dust repellent coatings may prevent friction between surfaces, prevent staining of surfaces, etc.

Example 1: A Method of Preparing a Titania-Silica Coating Solution with Minimal $TiO_2$ One exemplary titanium dioxide sol may be prepared using the following procedure. At room temperature, 1.8 mL Ti(IV) 2-ethylhexoxide 95% solution is slowly added to 22 mL of reagent grade isopropanol and stirred. Roughly 0.2 mL of $H_2O$ is added dropwise to the solution.

After stirring for one hour, the resulting solution is filtered using 25 μm pore size filter paper. The resulting sol may be found to be 1.2% $TiO_2$ by total weight, clear, colorless, without sediment, and not viscous. After approximately 72 hours this sol may develop a white precipitate, which can be resuspended by vigorous agitation.

This $TiO_2$ sol may then be used to prepare the titania-silica sol. In this experiment, about three milliliters of the $TiO_2$ sol described above is added to about 27 mL of colloidal silica in isopropanol (IPA-ST-UP, Nissan Chemical) and stirred. Approximately 30 mL of isopropanol may then be added to the solution. This solution is left to stir for one hour and then filtered through 25 μm pore size filter paper. This solution may contain about 2% by weight $TiO_2$ to about 98% $SiO_2$ and appear clear, colorless, without sediment, and not viscous.

It should be noted that the amounts of materials presented herein are merely exemplary. Other amounts and/or other materials may be employed in the process of making the silica and titania coatings shown and described herein.

Example 2: A Method of Coating a Glass Substrate with Titania-Silica

In this embodiment, a solution of titania-silica is prepared as described in Example 1. Glass substrates are prepared by submerging them in a 0.5 molar hydrochloric acid bath at 60° C. for one hour. The substrates are then rinsed with distilled water, placed in an acetone ultrasonic bath for 30 minutes, and placed in an isopropanol ultrasonic bath for 30 minutes. After one more isopropanol rinse, the substrates are dried in air. The dry substrates are placed in a furnace at 60° C. for one hour, cooled in the furnace and quickly transferred to a fume hood for film deposition. This procedure may be performed to ensure clean uncontaminated substrates without residue and trapped water to facilitate the best metal oxide film adhesion.

The substrates are then dip coated in the titania-silica solution at a 12 cm/min rate at room temperature. Films are then air dried for 10 minutes and placed in an air furnace for annealing at 200° C. for one hour. The resulting films are continuous, crack free and moderately uniform.

Dust adhesion may then be tested with JSC-1A lunar dust simulant. For example, when a fine dust simulant is poured on both the coated and uncoated sections, and the sample is then tilted by 90° to allow the dust to slide off the surface, two cotton swabs may be wiped across fixed lengths of the coated and uncoated surfaces. The amount of dust collected may be compared with a compound optical microscope. The amount of dust simulant from the coated section reveals very little dust when compared to the amount of dust simulant from the coated section.

Micrographs of the sample surface are taken using a compound optical microscope to quantitatively estimate reduction of dust adhesion for the coatings applied on glass substrates. The images are then processed using ImageJ software. A particle count on the 8-bit, grayscale images is then performed through ImageJ with the minimum particle size of 10 pixels. The reduction in the number of dust particles between uncoated and coated sides is estimated using: β=(# particles on uncoated section −# of particle on coated section)/(# of particles on uncoated section).

Based on this approximation, the sample indicates a dust adhesion reduction of about 82%. This method of measuring dust adhesion counts clumps of particles agglomerated on the uncoated side as a single particle for the analysis. Based on estimates of total area in the photographs not covered with dust, the reduction of dust adhesion is over 90%.

Example 3: A Method of Coating Stainless-Steel and Alumina Substrates with Titania-Silica In another embodiment, a titania-silica solution is prepared as described in Example 1. Mirror-polished grade 334 stainless steel is used as a substrate for this experiment and is cleaned and prepared before application of the coatings. The metal substrates are submerged in 0.5 molar hydrochloric acid at 60° C. for one hour. The substrates are removed from the acid, rinsed with distilled water, rinsed with isopropanol, and then dried in air. The clean steel substrates are dip coated with the solution described above in Example 1 at 12 cm/min rate.

The stainless-steel sample is annealed at 350° C. for one hour with a ramp rate of 10° C. Other samples prepared in the same manner are annealed at 100° C., 600° C., and 800° C., but no notable difference in dust adhesion is observed due to different annealing temperatures.

Dust adhesion for coated and uncoated surfaces can also be visually estimated for samples via a swab test. For example, clean cotton swabs may be rubbed across the coated and uncoated portions of the slides. The amount of dust collected on both surfaces is then compared to show that the coating reduces the amount of dust accumulated on the metal surface.

In addition to steel, a titania-silica solution can be used to coat an aluminum substrate. For example, the aluminum may be prepared for thin film coating deposition with a simplified cleaning procedure. The substrate is rinsed with distilled water, followed by acetone, and then isopropanol. The aluminum blank is dried in air and dipped in the titania-silica solution at 12 cm/min rate. After drying in air, the sample is annealed at 200° C. for one hour. The coated aluminum section demonstrates a significant decrease in dust adhesion compared to the uncoated section.

Example 4: A Method of Preparing Silica-Titania-Copper Coating Solutions

In this embodiment, silica-titania-copper coatings can be made by first preparing a titania-copper solution from titanium tetraisopropoxide and copper nitrate in isopropanol. In a beaker, 3.7 mL of Ti(IV) isopropoxide is added to 47 mL of isopropanol and stirred. Cu(II) nitrate powder (0.24 g) was added and the solution is left to stir for 24 hours. The solution is then filtered with 25 μm pore filter paper and the resulting sol appears greenish-blue, clear, and non-viscous.

This titania-copper intermediate is then mixed into a $SiO_2$ sol. Three milliliters of the titania-copper sol are added to 27 mL of colloidal silica in isopropanol (IPA-ST-UP, Nissan Chemical) in a beaker and stirred. An additional 20 mL of isopropanol is added to the solution. This sol is stirred for one hour and subsequently filtered with 6 μm pore filter paper. The resulting sol appears lightly green-blue tinted, clear, slightly viscous with slight pearlescent appearance. X-ray fluorescence analysis of this sol after drying indicates a Si:Ti:Cu ratio of 94.1:4.9:0.49.

Example 5: A Method of Coating a Glass Substrate with Silica-Titania-Copper

In this embodiment, a silica-titania-copper solution can be prepared as described in Example 4. For example, glass substrates are prepared by submerging them in a 0.5 molar hydrochloric acid bath at 60° C. for one hour. The substrates are rinsed with distilled water, placed in an acetone ultrasonic bath for 30 minutes, and then placed in an isopropanol ultrasonic bath for 30 minutes. After one more isopropanol rinse, the substrates are dried in air. The dry substrates are placed in a furnace at 60° C. for one hour, cooled in the furnace, and quickly transferred to a fume hood for film deposition.

The clean glass substrates are then dip coated in the silica-titania-copper solution at a 10 cm/min rate at room temperature. Films are then air dried for 10 minutes and placed in the air furnace for annealing at 200° C. for one hour.

The resulting film is clear, continuous, and free of cracks. When examined under 10× magnification, the film is found to exhibit variation in coating thickness. These films successfully repelled dust despite the uneven thickness, and no microcracks are observed.

To reduce any wavy appearance in the films, about 20 mL of isopropanol can be added to a resulting silica-titania-copper sol. Films on clean glass substrates are then produced. The films are continuous, clear, uniform, and repel dust. The estimated reduction in dust adhesion compared to uncoated surface is about 96%.

Example 6: A Method of Preparing and Coating a Titania-Silica Coating Solution with High $TiO_2$ Concentration In another embodiment, a solution with a higher amount of $TiO_2$ is prepared by slowly adding 1.8 mL of a 95% Ti(IV) 2-ethylhexoxide solution to 22 mL of reagent grade isopropanol. The solution is filtered using 25 μm pore-size filter paper after stirring for one hour. The resulting sol is clear, colorless, without sediment, and non-viscous.

In a separate beaker, about 20 mL of isopropanol is added to about 5 mL of colloidal silica in isopropanol (IPA-ST-UP, Nissan Chemical) and stirred. Then, about 20 mL of the $TiO_2$ sol is mixed with this $SiO_2$. The resulting solution is allowed to stir for one hour and is later filtered using filter paper (25 μm pore size). This sol appears clear, colorless, and non-viscous.

Thin films can be produced using this solution on clean glass substrates. The substrates are dip coated in the solution at a rate of 12 cm/min, allowed to air-dry and annealed at 350° C. These films are continuous, crack-free and repel dust. Images processed with ImageJ indicate approximately 86% dust adhesion reduction when coated with the titania-silica film.

Example 7: A Method of Coating Various Materials

In another embodiment, the titania silica solution described in Example 1 may be used to coat a variety of materials, including but not limited to filter paper, white loosely woven Nomex fabric, thin polyester fabric, and thick untreated cotton canvas. Samples of the materials are dipped in the solution, and the liquid is allowed to drip off the surfaces when necessary. The samples are then air dried and placed in an air furnace at 60° C. for 30 minutes.

After cooling, the samples are coated with JSC-1A simulant and lightly shaken to remove the simulant from the surface. On the tested materials, visible dust adhesion decreased significantly for the coated portions. The silica-titania coatings reduce dust adhesion to these materials.

Example 8: A Method of Preparing Layered Films

In another embodiment, layered films are created using both a silica-titania-copper sol and a titania-silica sol. The silica-titania-copper sol is prepared using the method described in Example 4. The titania-silica sol is prepared as described in Example 1.

Glass substrates are prepared by submerging them in a 0.5 molar hydrochloric acid bath at 60° C. for one hour. The substrates are rinsed with distilled water, placed in an acetone ultrasonic bath for 30 minutes, and then placed in an isopropanol ultrasonic bath for 30 minutes. After one more isopropanol rinse, the substrates are dried in air. The dry substrates are placed in a furnace at 60° C. for one hour, cooled in the furnace and quickly transferred to a fume hood for film deposition. This procedure is performed to ensure clean uncontaminated substrates without residue and trapped water to facilitate metal oxide film adhesion.

The clean substrate is dip coated in silica-titania-copper at a 12 cm/min dipping speed. After a brief air drying, the sample is annealed at 100° C. for one hour and slowly cooled to room temperature in air. The dry sample is then dip coated in the titania-silica sol at a 12 cm/min dipping speed and the dipping height is adjusted by 1 mm. The sample is then dipped in the silica-titania-copper sol, followed by a second dip in the titania-silica sol. Finally, the sample is dip coated in the silica-titania-copper at a 12 cm/min dipping speed with the dipping height being adjusted by 4 mm to allow independent observation of the middle layer. The layered film is annealed at 100° C. for one hour. Quantitative analysis of 10× magnified micrographs for coated and uncoated surfaces indicates a 93% reduction of dust adhesion.

Example 9: An Application of Titania Films to Reduce Dust Adhesion

In another embodiment, a pure titania film on a crystalline (c-cut sapphire) substrate is studied to evaluate possible reduction in dust adhesion and to explore methods of tuning the crystalline phase of this material.

The film is deposited using a pulsed laser deposition system with an excimer laser (e.g., λ=256 nm, pulse width=25 ns) held at a 45° angle to a rotating $TiO_2$ mixed-phase target inside vacuum chamber. Pulse energy is set to 296 mJ with 50 Hz repetition rate. The chamber pressure is set to 35 mTorr and oxygen is introduced as a background gas. The substrate temperature during deposition is about 250° C. The film is then annealed in a vacuum furnace at 500° C. for 4 hours and allowed to cool to room temperature. The titania film was 80% anatase (110) form, indicating a mixed phase with a strongly preferred anatase orientation.

A dust adhesion test revealed that, when the coated and uncoated surfaces of a sample are covered with JSC-1A dust simulant and flipped 90° to allow dust to slide off, dust adhered to the sapphire substrate in significantly higher quantities than to the titania film. Analysis of obtained micrographs indicated 81% reduction in dust adhesion for the surface coated with titania film.

Example 10: Alternate Methods of Preparing Silica-Titania Coatings with Additional Source of Silica Nanoparticles to Various Substrates In this embodiment, a solution with a higher amount of $TiO_2$ is prepared by slowly adding 0.9 mL of a 95% Ti(IV) 2-ethylhexoxide solution to 24 mL of reagent grade isopropanol. The solution is filtered using 25 μm pore-size filter paper after stirring for one hour. The resulting sol is clear, colorless, without sediment, and non-viscous.

In a separate beaker, 40 mL of isopropanol is added to 2 mL of colloidal silica in isopropanol (IPA-ST-UP, Nissan Chemical) and stirred.

In a separate beaker, 21 g of reagent grade isopropanol is mixed with 0.25 g of ammonia and 0.9 g of $H_2O$. After brief stirring, 5 g of Tetraethyl orthosilicate mixed with 10 g of reagent grade isopropanol is added to the solution and the mixture is allowed to stir for one hour.

For a Cu-containing sol, 24 g of reagent grade isopropanol is mixed with 0.24 g of Cu(II) nitrate. The solution is allowed to stir briefly until the powder was completely dissolved.

The final mixture consisted of 10.4 ml of $TiO_2$ sol, 3.0 ml of $SiO_2$ sol based on IPA-ST-UP, 2.6 ml of TEOS-based $SiO_2$ sol and 1.3 ml of Cu-containing sol, as discussed above. This final solution is allowed to mix for 1 hour with a stir bar and ultrasonicated for an additional half an hour. This resulting sol appeared light-blue or green-blue and clear.

Thin films can be produced using this solution on clean glass substrates. For example, the substrates can be dip coated in the solution at a rate of 12 cm/min, allowed to air-dry, and annealed at 350° C. The same coating protocol may be used for steel and aluminum alloy substrates.

These films are continuous, crack-free and repel dust when tested both in air and in vacuum. In some embodiments, the amount of dust on coated and uncoated sides is quantified and estimated that the reduction of dust adhesion is by a factor of approximately 92 if measured by the number of adhered particles, and 220 if measured by the area of the adhered dust particles.

Example 11. Dust Adhesion to Coated and Uncoated Surfaces in Vacuum

In some embodiments, the protocol described in Example 6 is applied to a glass substrate and dust adhesion was tested under partial vacuum. For example, a glass sample may be placed in a small vacuum chamber along with a closed metal box filled with lunar dust simulant and the pressure in the chamber is brought to 35 mTorr. The pressure may vary between sets of experiments but it is generally between 35 and 50 mTorr. When the test pressure is reached, the dust is released (e.g., using magnetic manipulation mechanism) and allowed to fall on the sample installed at 45 degrees to horizontal. No additional dust removal mechanism is used in these tests. The chamber is brought back to atmospheric pressure and the samples are removed from the chamber and imaged under a microscope. Images revealed that the reduction of dust that adhered to the coated surface when compared to the uncoated surface is estimated to be about a factor of 21.

Example 12. Coating Performance on Different Substrates in Vacuum Conditions

In this embodiment, the same coating protocol described in Example 10 is used to coat surfaces of different substrates, including Al alloy, steel, and Kapton. The protocol for Kapton did not include annealing. Instead, the coating on this substrate is air dried for about 1 hour.

Vacuum tests are performed in 35-50 mTorr partial vacuum. The testing protocol described in example 11 is used for testing the performance of the coating on these substrates. It should be noted that the Kapton surface appears to have indentations even prior to being exposed to lunar dust. This material is relatively soft and has a relatively high surface roughness because of it. Some dark spots on a Kapton surface can be explained by this phenomenon, but they are counted as dust particles in our analysis both in coated and uncoated Kapton.

Example 13: Alternative Method of Applying Silica-Titania Coatings

Sol-gel coatings described herein can also be applied via spray coating to coat large and irregularly shaped surfaces. For this example, the coating protocol described in Example 6 is applied to an electro-permanent magnet. Part of the magnet is masked off using clear plastic film and tape.

After masking part of the magnet, the sol-gel is diluted with 25 ml of ethanol and sprayed on the magnet using spray bottle located about 40 cm away from the surface of the magnet (e.g., to avoid depositing large droplets). Spraying continues until the surface appears to be covered with no gaps (e.g., three to four sprays were enough in this case).

The resulting coating is tested by introducing highly magnetic lunar dust simulant to both coated and uncoated surfaces of the magnet in the "off" state (e.g., the magnet still had some residual magnetization). Some additional dust removal may be performed in this example (e.g., the magnet was lightly tapped on to allow dust to fall off). Dust may stick to the uncoated surface strongly enough to remain on the surface after this tapping procedure, while the majority of dust was removed from the coated surface, indicating reduced dust adhesion to the coated surface.

Example 14: Other Alternate Methods of Applying Silica-Titania Coatings

In addition to being applied via liquid techniques such as dip-coating, the silica-titania coatings may be applied through any mechanical, chemical, and/or physical deposition methods. For example, a high-vacuum physical vapor deposition chamber may be employed to evenly apply the coating to the substrate. Physical vapor deposition provides greater control of thickness and phase of the applied material. Alternative methods of coating may include but are not limited to pulsed-laser deposition, sputter-coating, physical vapor deposition, chemical vapor deposition, spin-coating, roll-to-roll coating, electrochemical deposition, and spray-coating.

Figure 3:
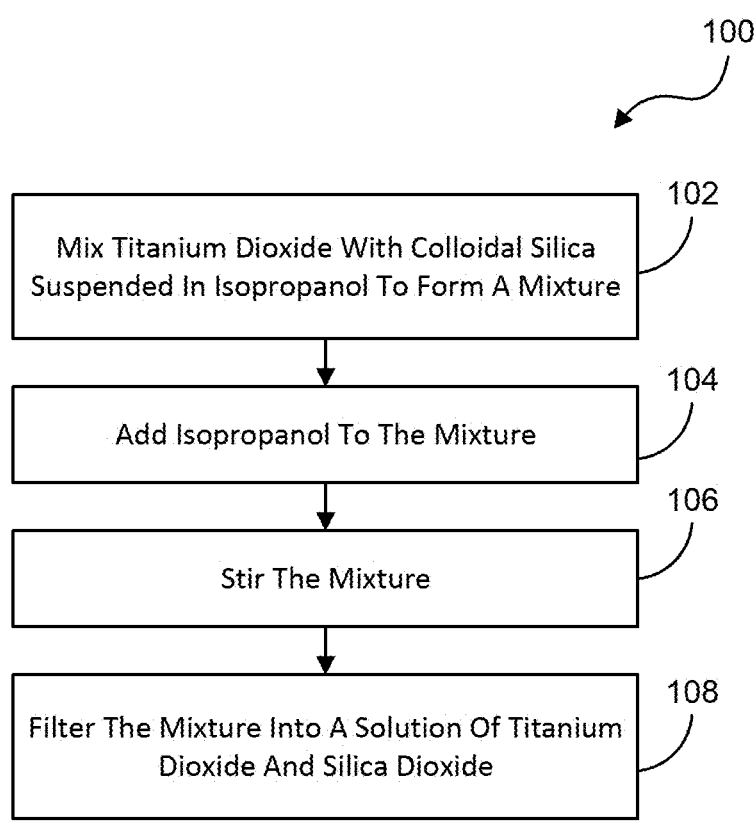
FIG. 3 is a flowchart of an exemplary process for making a dust repellant coating.

FIG. 3 is a flowchart of an exemplary process 100 for making a dust repellant coating. In this embodiment, the process 100 initiates by mixing titanium dioxide (e.g., about 3 mL) with colloidal silica (e.g., about 27 mL) that has been suspended in isopropanol, in the process element 102. The titanium dioxide may be obtained in a variety of ways as a matter of design choice, including those disclosed herein. This mixing of the titanium dioxide with the colloidal silica forms a mixture to which isopropanol may be added (e.g., approximately 30 mL), in the process element 104. The mixture may then be stirred (e.g., for about an hour), in the process element 106. Then, the mixture may be filtered into a solution of titanium dioxide and silica dioxide, in the process element 108. The solution may include about 2% titanium dioxide in about 98% silica dioxide. With the solution formed, the solution may be applied to any of a variety of surfaces to repel dust from the surfaces.

Figure 4:
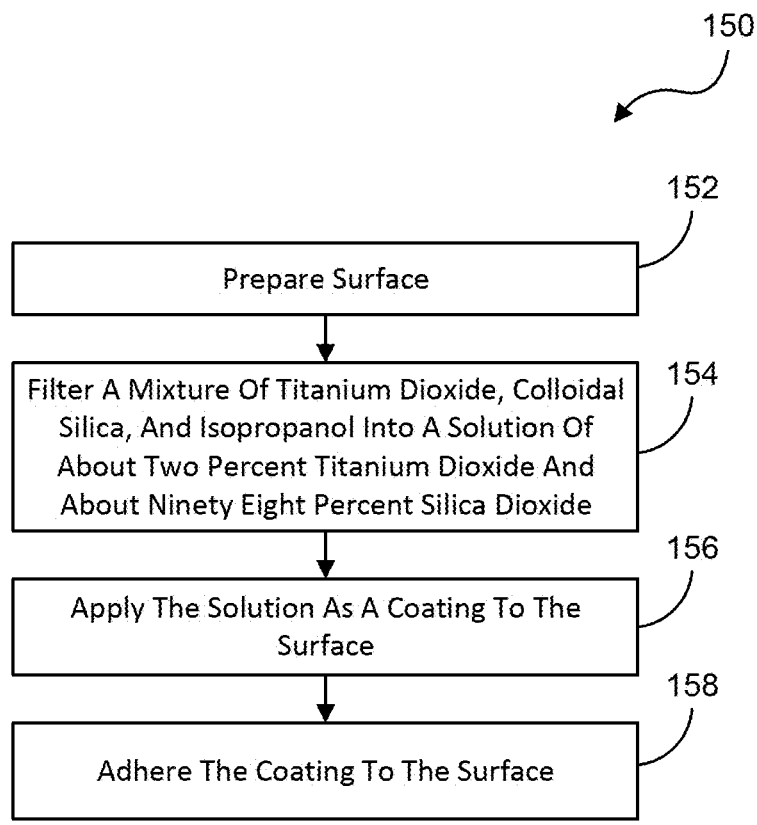
FIG. 4 is a flowchart of an exemplary process for applying a dust repellant coating.

In this regard, FIG. 4 is a flowchart of an exemplary process 150 for applying a dust repellant coating. In this embodiment, a surface is initially prepared, in the process element 152. Such may include cleaning the surface with alcohol, heating the surface in an oven or the like to remove any impurities from the surface. From there, a mixture of titanium dioxide colloidal silica and isopropanol may be filtered into a solution of about 2% titanium dioxide and about 98% silica dioxide, in the process element 154. Then, the solution may be applied as a coating to the surface, in the process element 156. The method may then include adhering the coating to the surface, in the process element 158 (e.g., via air drying, baking, heating, etc.). Once the coating has adhered to the surface, the surface is rendered virtually dust free and/or optically transparent.

Any of the above embodiments herein may be rearranged and/or combined with other embodiments. Accordingly, the invention is not to be limited to any particular embodiment disclosed herein.

What is claimed is:

1. A method of making a dust repellant coating, the method comprising:
    combining about one part of a titanium dioxide sol with about nine parts of colloidal silica to form a mixture;
    adding approximately ten parts of solvent to the mixture;
    stirring the mixture for about an hour; and
    filtering the mixture into a solution of titanium dioxide and silica dioxide.

2. The method of claim 1, further comprising:
    adding at least one of a metal additive, an organic additive, a metal salt, or a metal oxide to the mixture.

3. The method of claim 2, wherein:
    the metal oxide comprises at least one of alpha alumina, gamma alumina, titania, zirconia, copper oxide, zinc oxide, or mixtures thereof.

4. The method of claim 2, wherein:
    the metal salt comprises at least one of copper, silver, chromium, aluminum, gold, or mixtures thereof.

5. The method of claim 2, wherein:
    the organic additive comprises at least one of methanol, ethyl alcohol, isopropyl alcohol, 1-butanol, 2-butanol, isobutanol, tert-butanol, or mixtures thereof.

6. The method of claim 1, wherein:
    the solvent comprises isopropanol.

7. The method of claim 1, wherein:
    the solution of titanium dioxide and silica dioxide comprises between about one and ten percent titanium dioxide and between about ninety and ninety-nine percent silica dioxide.

\* \* \* \* \*